United States Patent Office 3,287,470
Patented Nov. 22, 1966

3,287,470
METAL PHTHALOCYANINE DYESTUFFS
André Pugin, Riehen, near Basel, and Jean Rody, Basel, Switzerland, assignors to J. R. Geigy A.-G., Basel, Switzerland
No Drawing. Filed July 1, 1963, Ser. No. 292,104
Claims priority, application Switzerland, July 10, 1962, 8,319/62
7 Claims. (Cl. 260—314.5)

The present invention relates to new metal phthalocyanine dyestuffs which are soluble in acetone, a process for the production thereof, their use for the dyeing of high molecular hydrophobic organic material in the mass and, as industrial product, the materials dyed therewith.

It is one of the objects of the invention to provide new metal phthalocyanine dyestuffs which are more readily filtrable than the known dyestuffs of this class and which are consequently better suitable for the spinning of, especially, dyed-in-the-mass acetyl cellulose and the like fibers.

In conventional spinning of such acetylcellulose, special, cumbersome precautions must be taken against a clogging up of the spinnerets. To prevent this from occurring, the phthalocyanine dyestuff containing acetone solution is filtered separately, the cellulose solution (acetyl cellulose) is filtered separately, and the filtrates from these two operations are mixed with each other and the mixture must again be subjected to usually several filtration steps, namely at least one after mixing and a second one immediately prior to feeding of the mixture to the spinnerets.

It has been found that new metal phthalocyanine dyestuffs which are particularly easily soluble in acetone are obtained by reacting one mole of a metal phthalocyanine tetrasulphonic acid halide with 4 mols of an amine of the formula

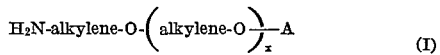

wherein
"alkylene" represents an alkylene radical having 2–3 carbon atoms,
A represents an alkyl radical, preferably of 1 to 12 carbon atoms, and
x represents 1 or 2, and the recurring "alkylene" groups can be the same or different from each other, or by reacting one mole of the aforesaid halide with, in all, four moles of a mixture of several, e.g. two, three or four amines of Formula I to form a metal phthalocyanine dyestuff of the formula

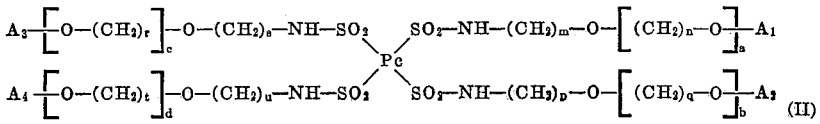

wherein
Pc is a metal phthalocyanine complex dyestuff radical in which the metal is copper, nickel or cobalt,
each of $A_1$, $A_2$, $A_3$ and $A_4$ independently is alkyl with preferably from 1 to 12 carbon atoms,
each of $a$, $b$, $c$ and $d$, independently, is an integer ranging from 1 to 2, and
each of $m$, $n$, $p$, $q$, $r$, $s$, $t$ and $u$, taken independently is an integer ranging from 2 to 3.

In the dyestuff of Formula II the four sulphamide groups are thus the same, or different from each other, depending on the number of amines reacted with the aforesaid halides.

"Alkylene" represents the 1,2-ethylene or the 1,2- or 1,3-propylene radical.

Because of its high stability and purity of shade, copper phthalocyanine tetrasulphonic acid chloride is preferably used as metal phthalocyanine tetrasulphonic acid halide. However, the corresponding nickel and cobalt phthalocyanine sulphonic acid chlorides have also been used. The sulphonic acid chloride groups are in the 4- and/or in the 3-positions depending on whether, in the production thereof, 4-sulphophthalic acid is used as starting material or whether the groups are introduced by subsequent sulphonation or by direct sulphochlorination of the phthalocyanine. The phthalocyanines can be further substituted, for example, by maximally four halogens, for instance chlorine or bromine atoms per molecule. The use of as pure as possible copper phthalocyanine tetrasulphonic acid chloride is recommended.

Examples of amines of Formula I which are suitable in the production of the dyestuffs of Formula II according to the invention are: ethylene glycol-O-methyl-, ethylene glycol-O-ethyl-, ethylene glycol-O-propyl-, ethylene glycol-O-butyl-, -O'-(β-aminoethyl)- or -O'-(γ-aminopropyl)-diether or diethylene glycol-O-methyl-, diethylene glycol-O-ethyl- or diethylene glycol-O-butyl-O'-(β-aminoethyl) or -O'-(γ-amino-propyl)-tri-ether.

An improvement in the solubility properties of the end product is particularly attained by using mixtures of such amines in the production of the dyestuffs of Formula II.

These amines are obtained, for example, by adding acrylonitrile or acrylamide to the corresponding alkylene glycol or dialkylene glycol monoalkyl ethers and subsequently hydrogenating the nitrile compound obtained, or by degradation of the amide according to Hoffmann, or by reaction of the corresponding chloro- or sulpho-ester derivatives with ammonia.

The dyestuffs of Formula II according to the invention dissolve with a blue to greenish blue colour in organic solvents such as esters and, particularly, in ethanol and in acetone. They are suitable for the dyeing of natural or synthetic resins, waxes, lacquers such as nitro or stoving lacquers, and plastic masses e.g. of cellulose ethers or esters, in particular for the dyeing of acetyl cellulose in the mass, as well as for the dyeing of natural or synthetic polymers or condensation products. Above all, synthetic rayon can be dyed by the spin dyeing method in clear blue shades with the dyestuffs according to the invention. The dyeings are fast to chlorine, industrial fumes and light. A spinning mass of acetyl cellulose in acetone containing metal phthalocyanine dyestuffs according to the invention can be much more easily filtered and there is thus much less tendency to clog the spinnerets than there is with dyestuffs containing the previously known phthalocyanine compounds of a similar constitution.

In comparative filtration tests under identical conditions of pressure and filter composition, the dyestuffs of Formula II passed the filter five to ten times more rapidly than the corresponding dyestuffs of the formula

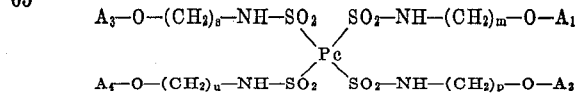

wherein $A_1$, $A_2$, $A_3$, $A_4$, $m$, $p$, $s$, $u$ and Pc have the meanings given under Formula II.

Further details can be seen from the following nonlimitative examples. The temperatures are in degrees centigrade, g. stands for "gram," ml. for "milliliter." Percentages and parts are by weight unless stated otherwise.

Example 1

38.8 g. of copper phthalocyanine tetrasulphonic acid chloride as 20%-aqueous paste are suspended in 200 g. of ice and 200 ml. of water and 47 g. of ethylene glycol-O-ethyl-O'-($\gamma$-amino-propyl)-di-ether are added. The pH of the suspension then rises to 10.8. After stirring for 1 hour, 40 ml. of a 2-N sodium acetate solution are added to the suspension. After stirring for 16 hours at room temperature, during which time the pH decreases to 9.2, the blue suspension is filtered, the residue is washed with water and dried. 42.5 g. of a blue product which is soluble in acetone are obtained. The product is very well suited for the dyeing of acetyl cellulose in the mass.

Blue dyestuffs having similarly good solubility properties are obtained by using in the process described in the above example, instead of ethylene glycol-O-ethyl-O'-($\gamma$-aminopropyl)-di-ether, 42.5 g. of ethylene glycol-O-methyl-O'-($\gamma$-aminopropyl)-di-ether or 56 g. of ethylene glycol-O-butyl-O'-($\gamma$-aminopropyl)-di-ether or 42.5 g. of ethylene glycol-O-ethyl-O'-($\beta$-aminoethyl)-di-ether or 92 g. ethylene glycol-O-dodecyl-O'-($\gamma$-aminopropyl)-di-ether or 61 g. of diethylene glycol-O-ethyl-O'-($\gamma$-aminopropyl)-tri-ether or 42.5 g. of ethylene glycol-O-butyl-O'-($\beta$-minoethyl)-di-ether.

More greenish dyestuffs having similar properties are also obtained by using, instead of copper phthalocyanine tetrasulphonic acid chloride, the same amounts of nickel or cobalt phthalocyanine tetrasulphonic acid chloride, and otherwise following the procedure given in the above example.

The starting metal phthalocyanine tetrasulphonic acid chlorides are produced by heating for 4 hours the respective metal phthalocyanine in 12 times the amount of chlorosulphonic acid at 140-142°, treating this solution for 2 hours with 1.5 times the amount of thionyl chloride at 75-80° (calculated on the metal phthalocyanine), precipitating the metal phthalocyanine tetrasulphonic acid chloride on ice and water, filtering oil and washing the residue with cold water until the washing water is neutral to Congo paper.

When, in this example, a mixture of 11.65 g. of ethylene glycol-O-methyl-O'-($\gamma$-aminopropyl)-di-ether, 12.75 g. of ethylene glycol-O'-ethyl-($\gamma$-aminopropyl)-diether, 14 g. of ethylene glycol-O-butyl-($\gamma$-aminopropyl)-di-ether and 11.65 g. of ethylene glycol-O-ethyl-O'-($\beta$-aminothyl)-di-ether is used as amine and otherwise the same procedure as given in the above example is followed, 45 g. of a blue acetone-soluble product are obtained, which is very well suited for the dyeing of acetyl cellulose in the mass.

Example 2

38.3 g. of the copper phthalocyanine tetrasulphonic acid chloride, produced as described in Example 1, as a 20%-aqueous paste are suspended in 200 g. of ice and 200 ml. of water and a mixture of 23.5 g. of ethylene glycol-O'-($\gamma$-aminopropyl)-di-ether and 28 g. of ethylene glycol-O-butyl-O'-($\gamma$-aminopropyl)-di-ether is added. The pH of the suspension rises to 10.5. After stirring for 1 hour, 40 ml. of 2-N sodium acetate solution are added to the suspension. After stirring for 16 hours at room temperature, whereby the pH decreases to 9.2, the blue suspension is filtered, and the residue is washed with water and dried. 44.6 g. of a blue acetone-soluble product are obtained which is very well suited for the dyeing of acetyl cellulose in the mass.

Example 3

38.8 g. of 4,4',4'',4'''-copper phthalocyanine tetrasulphonic acid chloride, as 20% aqueous paste, are suspended in 200 g. of ice and 200 ml. of water and 47 g. of ethylene glycol-O-ethyl-O'-($\gamma$-aminopropyly)-di-ether are added. The pH of the suspension rises to 10.7. After stirring for 16 hours at room temperature, whereby the pH decreases to 8.8, the blue suspension is filtered and the residue is washed with water and dried. 43 g. of a blue, acetone-soluble product are obtained which produces more red shades in lacquers and acetyl cellulose than the product described in the first paragraph of Example 1. The 4,4',4'',4'''-copper phthalocyanine tetrasulphonic acid chloride is produced by heating at 120° 35.8 g. of 4,4',4'',4'''-copper phthalocyanine tetrasulphonic acid (produced from 4-sulphophthalic acid anhydride), in 360 g. of chlorosulphonic acid for 2 hours, treating this solution with 54 g. of thionyl chloride for 2 hours at 75-80°, precipitating the 4,4',4'',4'''-copper phthalocyanine tetrasulphonic acid chloride onto ice and water, filtering and washing the residue with cold water.

Example 4

9 g. of nitrocellulose of medium viscosity, 3 g. of phthalic acid dibutyl ester and 18 g. of coconut oil fatty acid modified alkyd resin (consisting of 40% of coconut fatty acid, 39% phthalic acid anhydride and 21% of dimethylol propane), are dissolved in 24.5 g. of butyl acetate, 17.5 g. of ethyl acetate, 24.5 g. of toluene and 2.1 g. of butanol and 1.4 g. of 2 ethoxy-ethanol. A solution of 0.5 g. of the dyestuff produced according to Example 1 from copper phthalocyanine tetrasulphonic acid chloride and ethylene glycol-O-ethyl-O'-($\gamma$-aminopropyl)-ether in 10 g. of ethylene glycol monoethyl ether is added. After homogeneously mixing, this lacquer is sprayed onto aluminium sheet and dried in the air. A pure blue dyeing of good fastness to light is obtained.

Example 5

6.25 g. of 2-ethoxy-ethanol, 6 g. of a ketone formaldehyde condensation resin and 10 g. of the dyestuff produced according to Example 1 from copper phthalocyanine tetrasulphonic acid chloride and ethylene glycol-O-butyl-O'-($\gamma$-aminopropyl)-di-ether, are dissolved in 26 g. of ethylene glycol monomethyl ether and 49 g. of ethyl alcohol and 3 g. of trixylyl phosphate are added. This easily flowing printing colour is printed onto aluminium sheets by the intaglio printing process or the flexographic process. Brilliant blue prints having good fastness to light and water are obtained.

Example 6

1.3 g. of the dyestuff produced according to Example 1 from copper phthalocyanine tetrasulphonic acid chloride and ethylene glycol-O-butyl-O'-($\beta$-aminoethyl)-di-ether and 260 g. of acetyl cellulose are dissolved while stirring in 740 g. of acetone. This solution is then pumped with the aid of a gear pump through nozzles into a current of air. In this spinning process the nozzles are not clogged. Pure blue acetyl cellulose fibres are obtained which have very good fastness to wet and light.

We claim:
1. Metal phthalocyanine dyestuffs of the formula

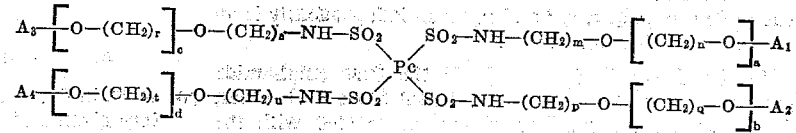

wherein
  Pc is a metal phthalocyanine complex dyestuff radical in which the metal is a member selected from the group consisting of copper, nickel and cobalt,
  each of $A_1$, $A_2$, $A_3$ and $A_4$, independently, is alkyl with from 1 to 12 carbon atoms,
  each of $a$, $b$, $c$ and $d$, independently, is an integer ranging from 1 to 2,
  each of $m$, $n$, $p$, $q$, $r$, $s$, $t$ and $u$, taken independently, is an integer ranging from 2 to 3.

2. A metal phthalocyanine dyestuff according to claim 1 wherein said metal is copper.

3. The copper phthalocyanine dystuff of the formula

Pc[SO$_2$—NH—CH$_2$CH$_2$CH$_2$OCH$_2$CH$_2$OCH$_2$CH$_3$]$_4$ wherein Pc is copper phthalocyanine residue.

4. The copper phthalocyanine dyestuff of the formula

Pc[SO$_2$—NH—CH$_2$CH$_2$CH$_2$OCH$_2$CH$_2$OCH$_3$]$_4$ wherein Pc is copper phthalocyanine residue.

5. The copper phthalocyanine dyestuff of the formula

Pc[SO$_2$—NH—CH$_2$CH$_2$CH$_2$OCH$_2$CH$_2$OCH$_2$CH$_2$CH$_2$CH$_3$]$_4$ wherein Pc is copper phthalocyanine residue.

6. The copper phthalocyanine dyestuff of the formula

Pc[SO$_2$NH—CH$_2$CH$_2$OCH$_2$CH$_2$OCH$_2$CH$_3$]$_4$ wherein Pc is copper phthalocyanine residue.

7. The copper phthalocyanine dyestuff of the formula

Pc[SO$_2$NHCH$_2$CH$_2$OCH$_2$CH$_2$OCH$_2$CH$_2$CH$_2$CH$_3$]$_4$ wherein Pc is copper phthalocyanine residue.

No references cited.

JOHN D. RANDOLPH, *Primary Examiner.*

J. A. PATTEN, *Assistant Examiner.*